Sept. 4, 1928.  
M. OAKLAND  
1,683,395  
CULTIVATING IMPLEMENT  
Filed April 5, 1927  
2 Sheets-Sheet 1
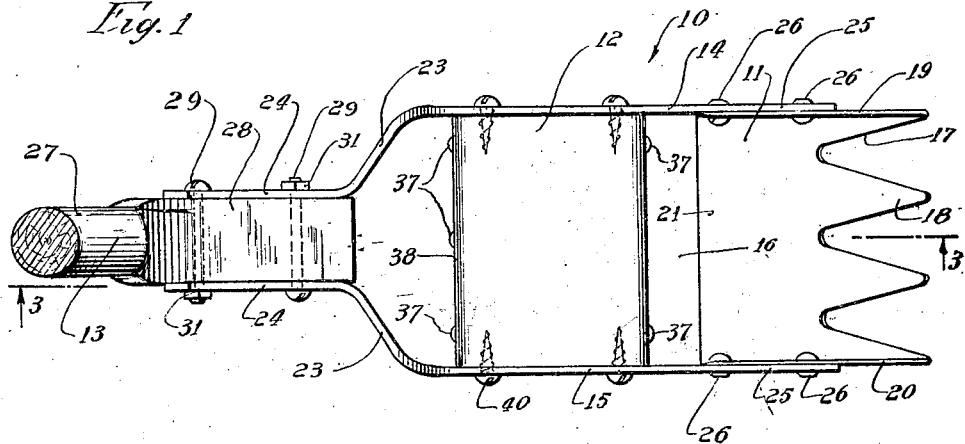
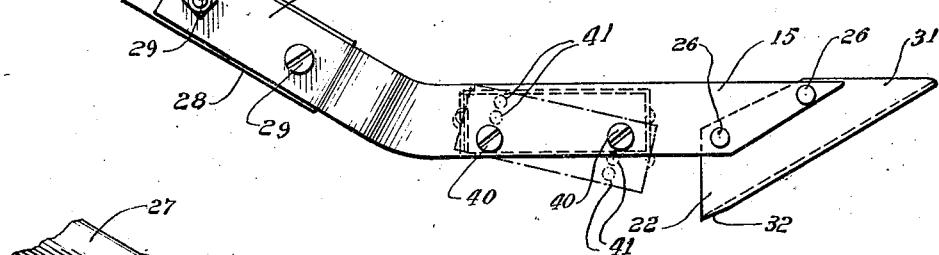
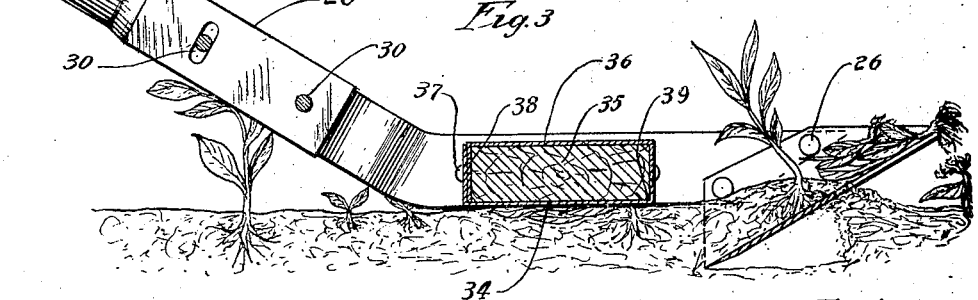
Inventor:  
Martin Oakland  
By: Williams, Bradbury,  
McCaleb & Hinkle  
Attys Sept. 4, 1928.
M. OAKLAND
CULTIVATING IMPLEMENT
Filed April 5, 1927    2 Sheets-Sheet 2
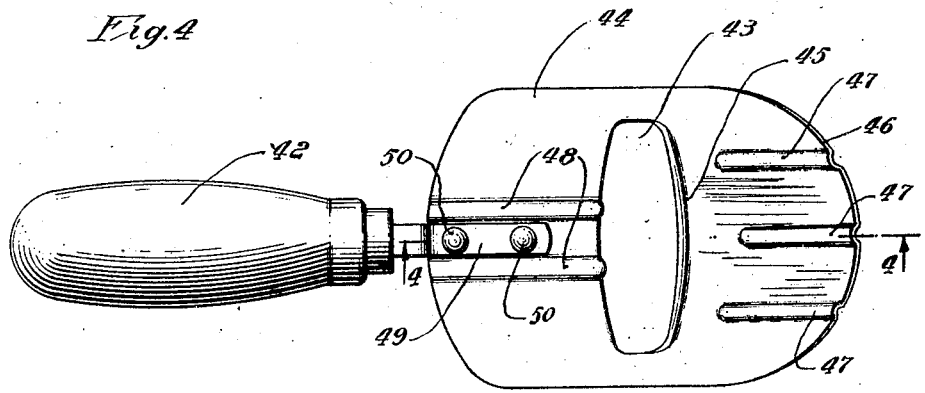
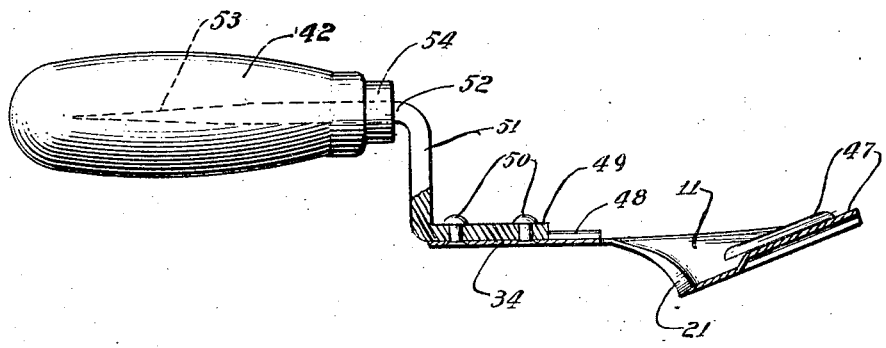
Inventor:
Martin Oakland.
By: Williams, Bradbury,
McCaleb & Hinkle
Atty's Patented Sept. 4, 1928.

1,683,395

UNITED STATES PATENT OFFICE.

MARTIN OAKLAND, OF CHICAGO, ILLINOIS.

CULTIVATING IMPLEMENT.

Application filed April 5, 1927. Serial No. 181,084.

My invention relates to cultivating implements, being more particularly concerned with garden implements especially adapted to be used for weeding and cultivating operations.

One of the objects of my invention is the provision of a simplified cultivating implement which is adapted to be drawn along the surface of the soil, uprooting the weeds, lifting, loosening and aerating the soil and depositing the weeds upon the top of the same, all in a single operation.

Another of the objects of my invention is the provision of a novel cultivating implement including means for digging and raising a layer of the soil within the weeds therein, means for determining the depth of such digging operation, means for breaking up and depositing the soil with the weeds exposed for drying, together with manual means for enabling the simultaneous performance of all of the foregoing operations by a simple pulling movement.

Other objects and advantages of my invention will appear more fully from the following description and from the accompanying drawings in which similar reference characters indicate similar parts throughout the several views.

Referring to the drawings, Figure 1 is a plan view of my cultivating implement with the upper portion of the handle broken away, Figure 2 is a side elevational view of the same, Figure 3 is an elevational, cross-sectional view on the line 3—3 showing the implement in operation, Figure 4 is a plan view of a modified form of my cultivating implement, and Figure 5 is an elevational view in partial cross-section on the line 4—4.

Referring to Figures 1 to 3, 10 indicates in its entirety my cultivating implement which may consist of a downwardly and forwardly sloping scoop 11, a flat, supporting member 12, the handle 13 and the lateral frame members 14 and 15 for supporting and connecting the foregoing members and reinforcing the same. The scoop 11 comprises a sheet metal member preferably formed of hardened steel, having a substantially rectangular bottom 16, with a plurality of notches 17 formed in its rear edge for the purpose of providing rearwardly projecting prongs 18. The prongs 18 may be of any shape but are preferably made of the conformation shown in order to accomplish the results later to be described with a simple and economical structure. If desired the edges of the prongs 18 and the notches 17 may be sharpened, thereby facilitating the use of the implement to sever large weeds which might otherwise interfere with its operation. The bottom 16 has upwardly turned flanges 19 and 20 at its sides, preferably at right angles to the bottom in order to form a substantially box-like scoop.

The supporting frame members 14 and 15 may be sheet metal straps of relatively thick material compared to the scoop 11 having inwardly extending bends 23 near the handle 13 terminating in the parallel ends 24 adapted to fit against the sides of the handle 13. The length of the bends 23 should be such that when the ends 25 of the frame members 14 and 15 are riveted to the flanges 19 and 20 of the scoop as at 26, the major portions of the members 14 and 15 will extend substantially parallel to each other.

The handle 13 may be either a short handle such as is employed upon a trowel or other tool but in the embodiment shown in Figures 1 to 3 it is preferably an elongated handle of substantially the same length as a hoe. The handle 13 may, therefore, have an upper elongated section 27 of substantially circular cross-section and a lower section 28 having substantially flat sides against which the ends 24 of the frame members 14 and 15 may be secured by bolts 29 or other convenient fastening means. In order to provide adjustment of the handle relative to the cultivating implement, one of the apertures 30 in the section 28 of the handle may be an elongated aperture which is adapted to receive its bolt 29 in a plurality of positions, the adjustment being maintained by the clamping action of the nuts 31 on the bolts 29.

The flanges 19 and 20 are riveted or otherwise permanently secured to the ends 25 of the frame members 14 and 16 in such position that the bottom 16 inclines forwardly and downwardly as shown in Figure 2. The inclination of the bottom 16 may likewise be made adjustable by providing slots in the flanges 19 and 20 and securing the same by bolts instead of the rivets 26 but in providing a tool for garden use I prefer to permanently fasten these parts together with the bottom 16 inclined at substantially an angle of thirty degrees to the edges of the frame pieces 14 and 15.

The upper edges 31 of the flanges 19 and 20 may be bevelled off in a line with the top of the frame members 14 and 15 in order to provide a finished tool having no unnecessary projections and the forward edges 22 of the flanges 19 and 20 may be cut off at right angles to the frame members 14 and 15 to present a vertical cutting edge when the implement is in operation. The forward edge 21 of the bottom and the forward edges 22 of the side flanges 19 and 20 are preferably bevelled off to a fairly sharp edge as at 32 below the bottom and at 33 inside the flanges, thereby providing a scoop 11 which is adapted to be drawn through the soil with comparative ease.

The supporting member 12 comprises a member having a substantially flat lower surface 34 which is adapted to rest upon the surface of the soil and slide thereon, determining the depth of cut of the scoop 11 by the distance between the plane of the surface 34 and the edge 21 of the scoop. The flat supporting member 12 may consist of a block of wood 35 having rectangular sides and of a length adapted to fit between the side frame members 14 and 15. The block 35 is preferably covered with a strip 36 of smooth and bright sheet metal such as tin or steel which is secured to the block 35 by bending the strip 36 about the block 35 and driving a plurality of nails 37 through registering apertures in the overlapping ends 38. In order to cover the block 35, the strip 36 is, of course, equal in width to the length of the block between the side frame members 14 and 15 and the sheet metal covering provides a smooth surface which is adapted to slide over the top of the soil with a minimum of friction.

In order to provide an aperture for the passage of the soil scooped up, the block 35 is secured to the side members 14 and 15 in spaced relation to the scoop 11 so that the distance between the edge 21 and the lower rear corner 39 of the block 35 is slightly greater than the depth of cut to provide ample room for the passage of the soil loosened by the scoop. In order to adjust the depth of cut of the scoop 11 the block 35 may be secured to the side frame members by a plurality of wood screws 40 passing through apertures in the side frame members 14 and 15 into the wooden block 35. The wooden block 35 may be provided with a plurality of apertures 41 so that the block may be secured in any of a plurality of positions, varying the slope as well as the depth of setting of the block 35. For instance, where the soil is more or less irregular it may be desirable to set the block 35 as shown in Figure 2, at a slight upper inclination toward the front or handle, thereby enabling the block more readily to pass over the irregularities on the surface of the soil.

Another convenient form of adjustable supporting member is a substantially flat sheet metal member having upwardly turned flanges to be secured to the side frame members 14 and 15 and the flanges may be provided with elongated apertures and screw-bolt fastening means so that the lower surface 34 provided thereby may be secured in any desired position.

The operation of my cultivating tool is as follows: The tool may be placed with the lower surface 34 of the supporting member lying flatly upon the ground and by pulling upon the handle 27 the scoop 11 will be drawn into the ground to a distance determined by the location of the lower edge 21 of the scoop relative to the plane of the surface 34. When the implement is drawn to the left in Figure 3 by means of the handle 27 the earth will be scooped up by the scoop 11, raising the earth and weeds and discharging the same over the prongs 18. As the implement is ordinarily used in weeding soil which has been previously tilled and planted, the soil will be more or less broken by the scooping action and will drop through the notches 17 between the prongs 18 while the weeds will pass up over the prongs 18 and be deposited upon the surface of the soil. The weeds are thereby exposed for drying by the sun, the soil is loosened and aerated about the roots of the adjacent plants and a loose layer of loam is provided which is adapted to more readily retain the moisture in the soil.

Referring to Figures 4 and 5, I have here shown a modified form of my cultivating implement which comprises a more simple construction adapted to be used in the cultivation of smaller areas by hand. This modification, however, embodies substantially the same operating elements as the previous embodiment having a flat surface 34, and a scoop 11, together with a short handle 42. The scoop and flat surface 34 may consist of a single piece of sheet metal 44, preferably of steel, having an aperture 43 formed in its center, of sufficient size to permit the passage of the soil loosened by the scoop 11.

The scoop 11 is formed by pressing downward the central portion of the sheet 44 adjacent the side 45 of the aperture 43 to form a curved scoop 11 and the forward edge 21 of the scoop 11 may be sharpened by bevelling the upper side of this edge. The sheet metal piece 44 may be of substantially oblong shape as shown, thereby providing an outer edge 46 which may be used after the manner of a trowel and the implement may be reinforced by a plurality of longitudinally extending ribs 47, upwardly pressed in the metal forming the scoop.

A pair of similar longitudinally pressed ribs 48 may be provided upon the other end of the sheet 44 and conveniently located upon each side of a bar of metal 49 which is secured to the sheet metal 44 by a plurality of rivets 50. The bar 49 may be upwardly bent at the edge of the sheet metal 44 as at 51 and again forwardly bent as at 52, extending into the handle 42 in a direction parallel to the surface of the sheet metal 44. The bar 52 may be provided with the usual tapered tang 53 which is adapted to be forced into an aperture in the handle 42, the handle 42 being reinforced against splitting by a sheet metal ferrule 54 about its inner end.

The modified tool shown in Figures 4 and 5 is operated in substantially the same manner as the previous embodiment, being drawn along the top of the soil by the handle 42 with the surface 34 resting upon the soil and the edge 21 of the scoop 11 digging up the weeds and soil and discharging them over the edge 46 of the tool. As this embodiment is designed to be operated with one hand and used in garden operations where the plants are closer together, it is of smaller size than the previous embodiment, being of substantially the same size as a garden trowel. If desired the forward edge 46 may be sharpened to facilitate other digging operations.

It will thus be observed that I have invented a cultivating implement which is adapted to be operated by a simple drawing motion and which will dig up the layer of the soil with the weeds and raise the same over the surface of the implement, depositing the soil in a loosened condition with the weeds on top to be dried by the sun. My invention also embodies means for adjusting the handle to a convenient height for persons of any stature and means for adjusting the depth to which the layer of soil will be cultivated thereby.

While I have illustrated and described the specific embodiment of my invention, many modifications may be made without departing from the spirit of the invention and I do not wish to be limited to the precise details of construction set forth, but desire to avail myself of all changes within the scope of the appended claims.

Having thus described my invention, what I claim as new and desire to secure by Letters Patent of the United States is:

1. In a cultivating implement, a downwardly inclined scoop having a forward cutting edge, a pair of lateral supporting members extending forward from said scoop, an elongated handle secured to said supporting members, means for adjustment of said supporting members on said handle, and a flat member supported by said lateral members intermediate said scoop and handle for determining the depth of cut of said scoop.

2. In a cultivating implement, a downwardly inclined scoop having a forward cutting edge and backwardly extending prongs, a pair of lateral supporting members extending forward from said scoop, an elongated handle secured to said supporting members, and a flat member adjustably supported by said lateral members intermediate said handle and said scoop whereby said flat member is adapted to determine the depth of cut of said scoop.

3. In a cultivating implement, a downwardly and forwardly inclined scoop having a substantially rectangular bottom and backwardly extending prongs, side flanges turned up at right angles to said bottom, the forward edges of said flanges and bottom being sharpened, side frame members extending forward from said scoop at an angle to said bottom, a handle secured to said side frame members, and a block supported between said side frame members with its lower face above the forward edge of said bottom.

4. In a cultivating implement, a downwardly and forwardly inclined scoop having a substantially rectangular bottom and backwardly extending prongs, side flanges turned up at right angles to said bottom, the forward edges of said flanges and bottom being sharpened, side frame members extending forward from said scoop at an angle to said bottom, a handle secured to said side frame members, a block supported between said side frame members with its lower face above the forward edge of said bottom, and a covering of metal for said block.

5. In a cultivating implement, the combination of a downwardly inclined scoop having a forward cutting edge, with means for connecting said scoop to a handle including a flat member supported intermediate said scoop and handle and adapted to determine the depth of cut of said scoop, said scoop being provided with a plurality of rearwardly extending prongs adapted to separate the weeds and the soil passing over them.

6. In a cultivating implement, a downwardly inclined scoop having a forward cutting edge, a pair of lateral supporting members extending forward from said scoop, a handle secured to said supporting members and a flat member supported between said lateral members intermediate said scoop and handle and adapted to determine the depth of cut of said scoop.

7. In a cultivating implement, the combination of a downwardly inclined scoop having a forward cutting edge, with means for connecting said scoop to a handle including a gauging member extending transversely in front of said scoop and spaced from said edge to form an aperture for passage of soil.

8. In a cultivating implement, the combination of a downwardly inclined scoop having a forward cutting edge, with means for connecting said scoop to a handle including a gauging member extending transversely in front of said scoop and spaced from said edge to form an aperture for passage of soil, said gauging member having a substantially flat metal surface.

9. In a cultivating implement, the combination of a downwardly inclined scoop having a forward cutting edge, with means for connecting said scoop to a handle including a gauging member extending transversely in front of said scoop and spaced from said edge to form an aperture for passage of soil and said scoop extending above said gauging member to lift and discharge the soil.

In witness whereof, I hereunto subscribe my name this 2nd day of April, 1927.

MARTIN OAKLAND.